US006557049B1

United States Patent
Maloy et al.

(10) Patent No.: US 6,557,049 B1
(45) Date of Patent: Apr. 29, 2003

(54) PROGRAMMABLE COMPUTERIZE ENCLOSURE MODULE FOR ACCOMMODATING SCSI DEVICES AND ASSOCIATED METHOD OF CONFIGURING OPERATION FEATURES THEREOF

(75) Inventors: Joseph M. Maloy, Colorado Springs, CO (US); Michael Darrell Kimminau, Security, CO (US); Paul Ernest Soulier, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/385,124

(22) Filed: Aug. 27, 1999

(51) Int. Cl.$^7$ .................................................. G06F 3/00

(52) U.S. Cl. .............................. 710/8; 710/10; 710/104; 713/1; 709/221

(58) Field of Search .............................. 710/1, 8, 9, 12, 710/15, 18, 62–64, 65, 72, 73, 10, 7, 104, 128, 101; 713/1, 150; 709/220, 221

(56) References Cited

U.S. PATENT DOCUMENTS

| | | | | |
|---|---|---|---|---|
| 4,787,082 A | * | 11/1988 | Delaney et al. ............... | 370/85 |
| 4,954,949 A | | 9/1990 | Rubin ........................ | 364/200 |
| 5,367,646 A | | 11/1994 | Pardillos et al. ............. | 395/325 |
| 5,495,584 A | | 2/1996 | Holman, Jr. et al. ........ | 395/308 |
| 5,608,608 A | * | 3/1997 | Flint et al. .................. | 361/686 |
| 5,630,163 A | | 5/1997 | Fung et al. .................. | 395/800 |
| 5,640,606 A | | 6/1997 | Glenn, Jr. et al. .......... | 395/882 |
| 5,644,777 A | | 7/1997 | Meyer et al. ................ | 395/800 |
| 5,644,790 A | | 7/1997 | Li et al. ...................... | 395/883 |
| 5,680,555 A | | 10/1997 | Bodo et al. .................. | 395/306 |
| 5,710,892 A | | 1/1998 | Goodnow et al. .......... | 395/307 |

(List continued on next page.)

OTHER PUBLICATIONS

Symbios Logic SYM2000 Storage Drive Module description.

Adaptec "Connecting 8–Bit and 16–Bit Devices to an Adaptec Wide Host Adapter" specifications—printed Nov. 30, 1998.

Adaptec "Connecting SCSI Peripherals Guide" instructions—printed Nov. 30, 1998.

(List continued on next page.)

Primary Examiner—Jeffrey Gaffin
Assistant Examiner—Rijue Mai
(74) Attorney, Agent, or Firm—Lathrop & Gage

(57) ABSTRACT

An enclosure module for accommodating a plurality of peripheral devices having: a computerized control unit in electrical communication with a user interface, a first and second bus with a bus expansion logic element therebetween that allows for operation of the buses as a single logical bus or as independent buses, termination circuitry for signal-appropriate bus termination, and a first and second plurality of connectors, each for electrical connection with one of the peripheral devices. The user interface to accept a first input (and can include a second, third, fourth, and so on, input) for optional manual configuration of a respective operational feature of the enclosure module, and if the input(s) is not registered, the feature can be automatically configured without the particular information provided by the input. The connectors can each have a multi-connect assembly for connection with a first, second, and third type connector. Also, an associated method of configuring a plurality of operational features, at least one of which can be done manually, of an enclosure module that can accommodate a plurality of peripheral devices having the steps of: providing a computerized control unit in electrical communication with a user interface, a first and second bus with a bus expansion logic element therebetween, termination circuitry for signal-appropriate bus termination, and a first and second plurality of connectors, each for electrical connection with a device; entering, through the user interface, a first input to manually configure at least one of the operational features; and if no such input is registered, automatically configuring the operational feature.

23 Claims, 8 Drawing Sheets

U.S. PATENT DOCUMENTS

| | | | |
|---|---|---|---|
| 5,715,409 A | | 2/1998 | Bucher et al. .............. 395/309 |
| 5,784,650 A | * | 7/1998 | Gulick et al. ................. 710/62 |
| 5,961,618 A | * | 10/1999 | Kim ........................... 710/101 |
| 6,008,985 A | * | 12/1999 | Lake et al. ................. 361/686 |
| 6,195,670 B1 | * | 2/2001 | Freeny ....................... 708/100 |
| 6,295,566 B1 | * | 9/2001 | Stufflebeam ................ 710/103 |

OTHER PUBLICATIONS

Dallas Semiconductor specification sheets for Differential SCSI Terminator and Ultra2 LVD/SE SCSI Terminator.

LSI Logic SYM53C120 Data Sheet.

Primary reference and technical manual for the SYM53C141 SCSI Bus Expander chip (Jul. 1997).

LSI Logic SCSI Host Adapter product line data sheet (Apr. 1998).

Clariion Storage Fibre Channel information sheets.

BYTE Lab Product Report (Sep. 1995)—printed on Aug. 25, 1999.

* cited by examiner

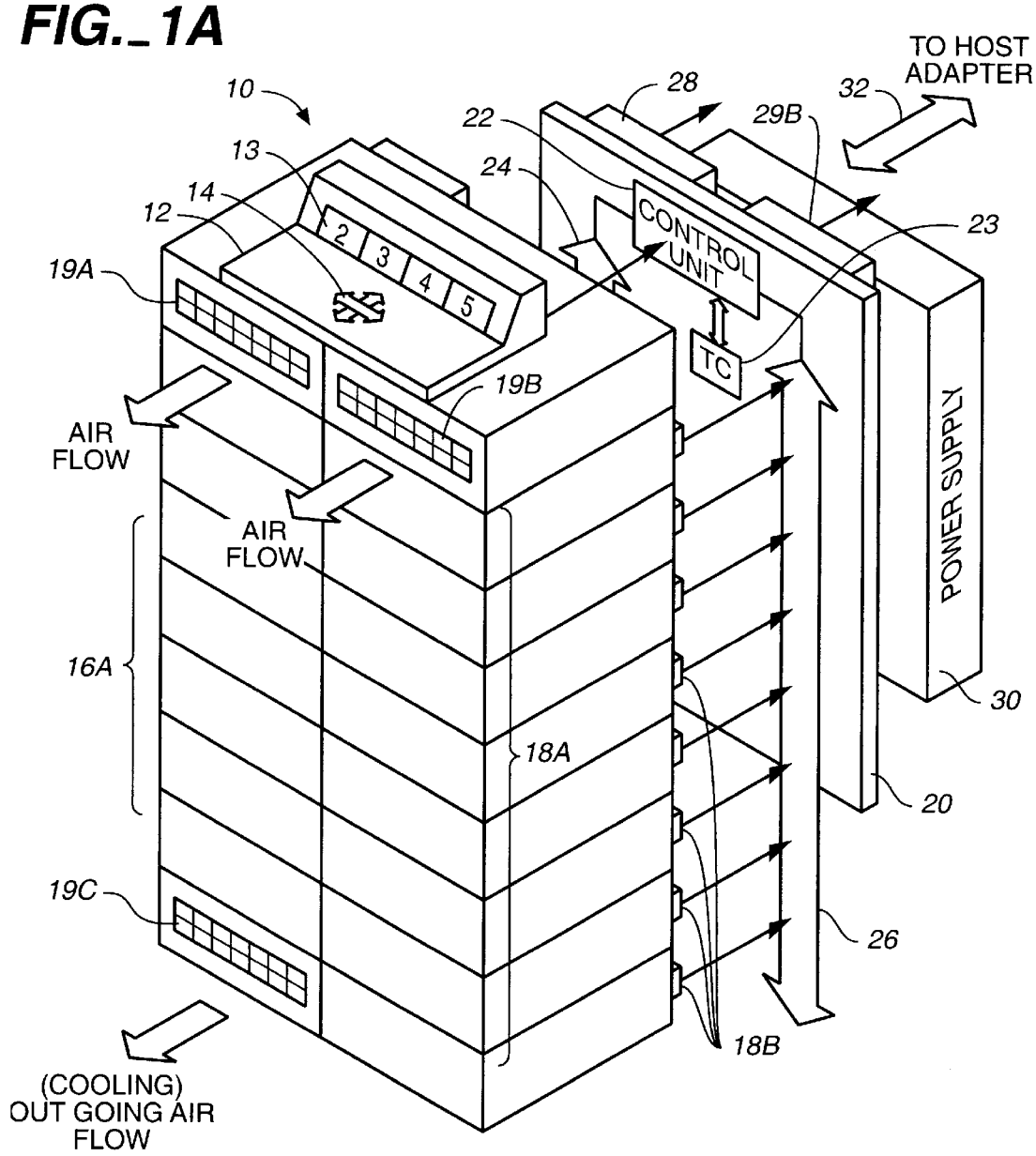
FIG._1A
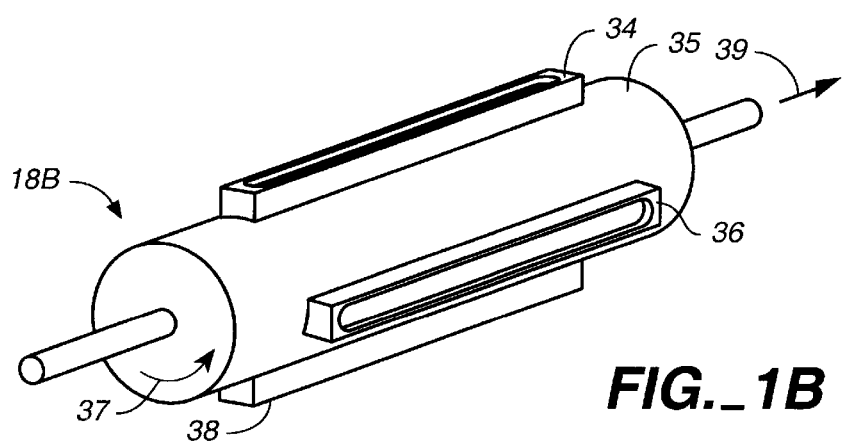
FIG._1B

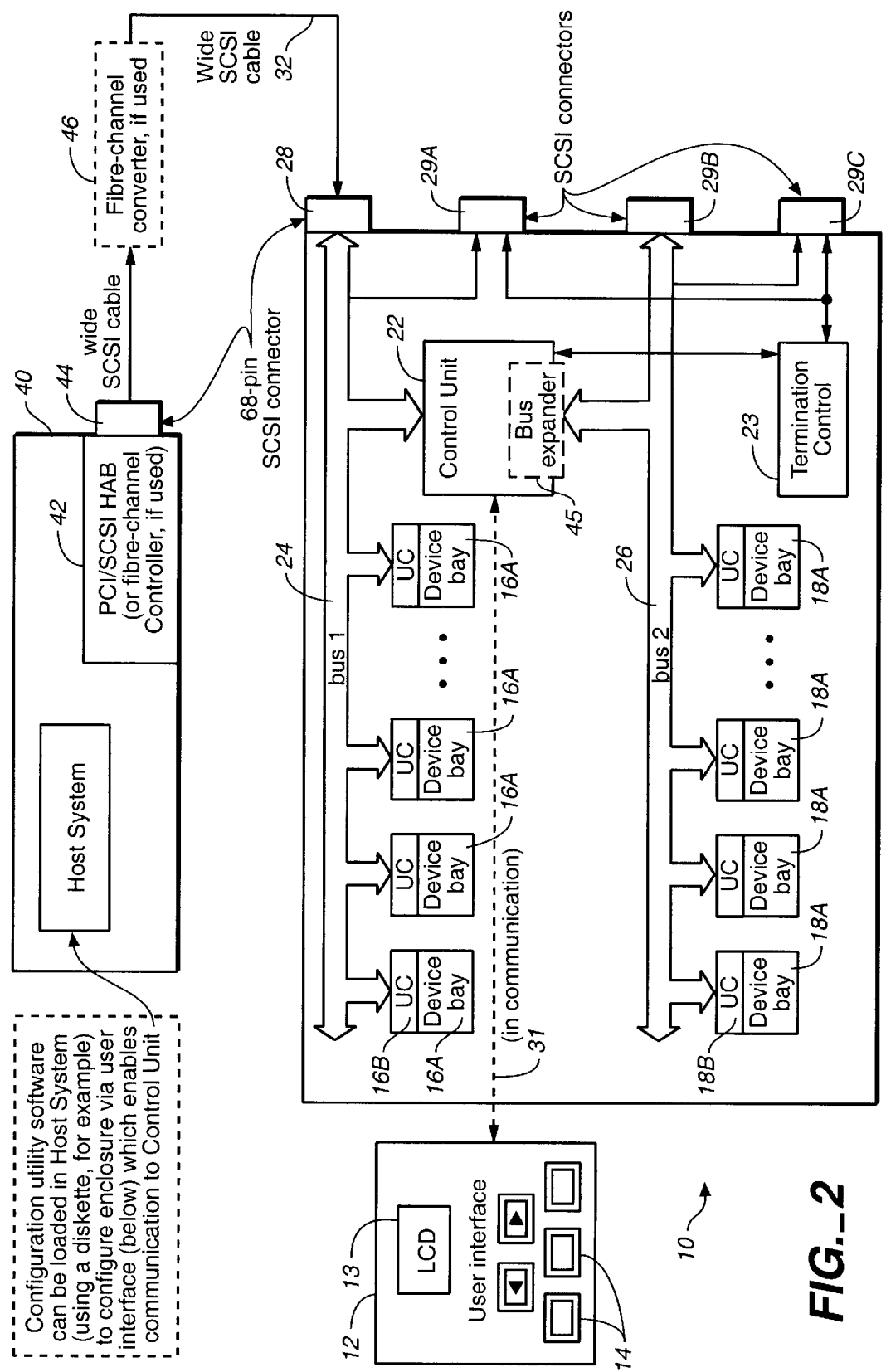
FIG._2

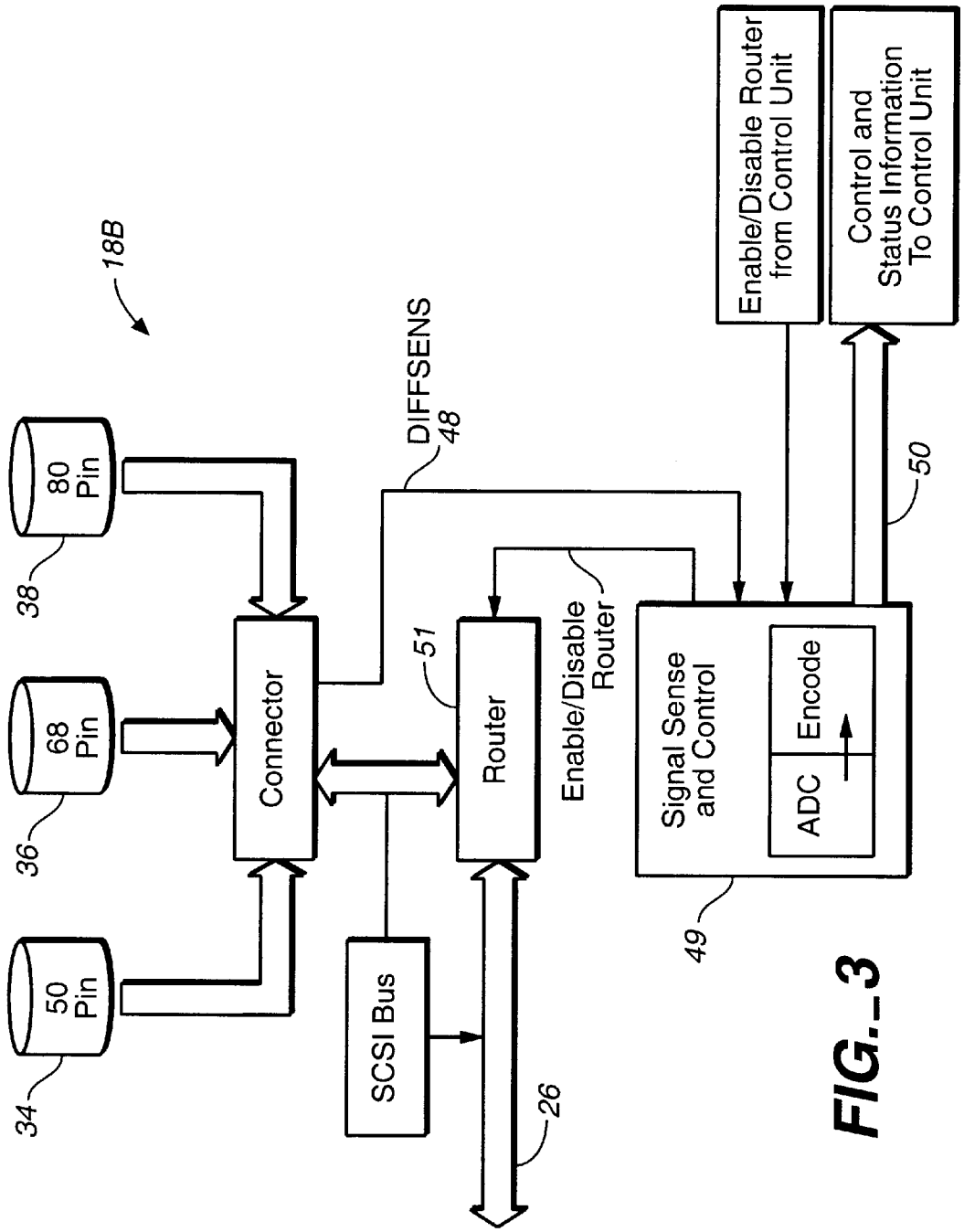
FIG._3

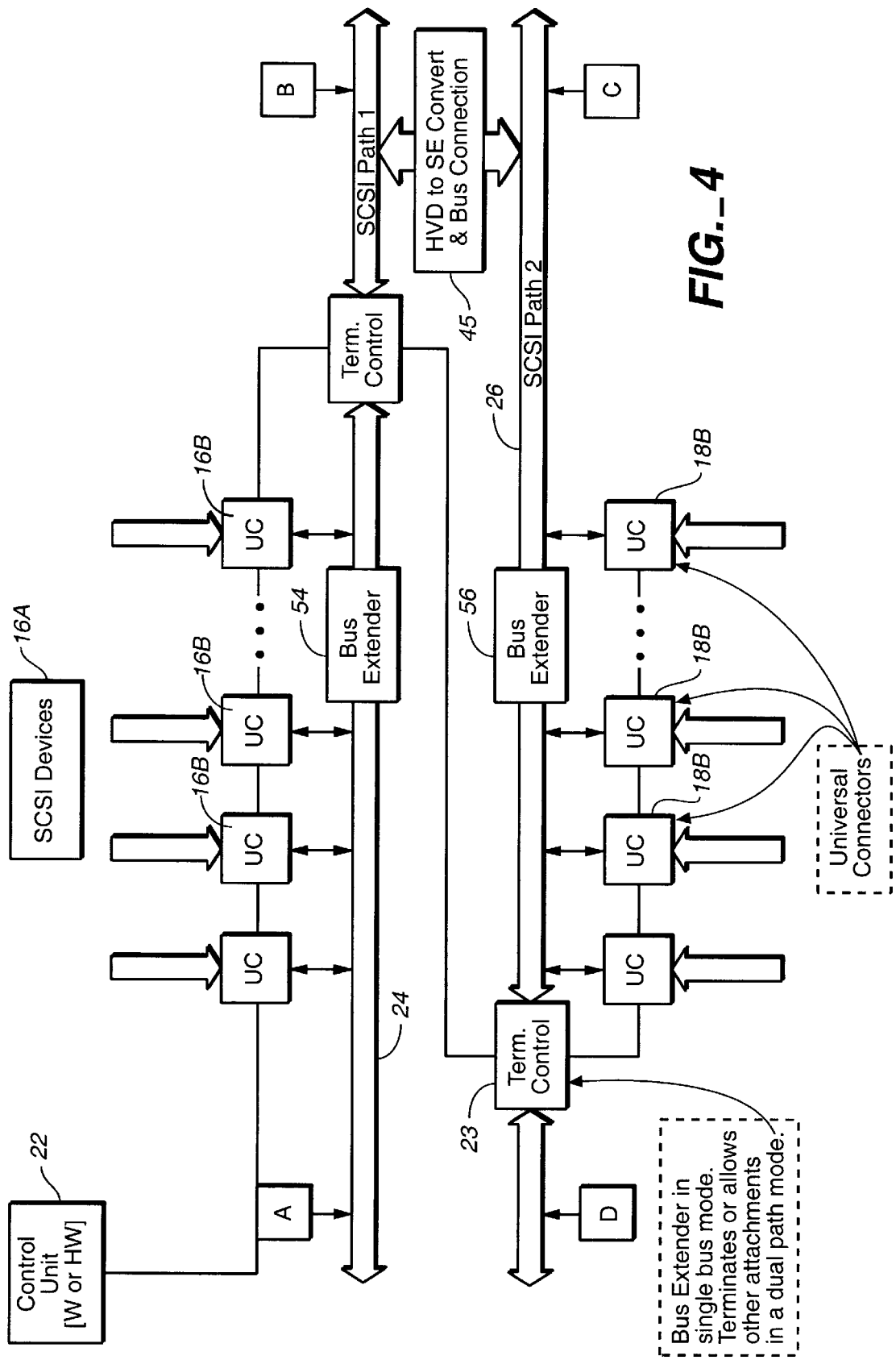
FIG._4

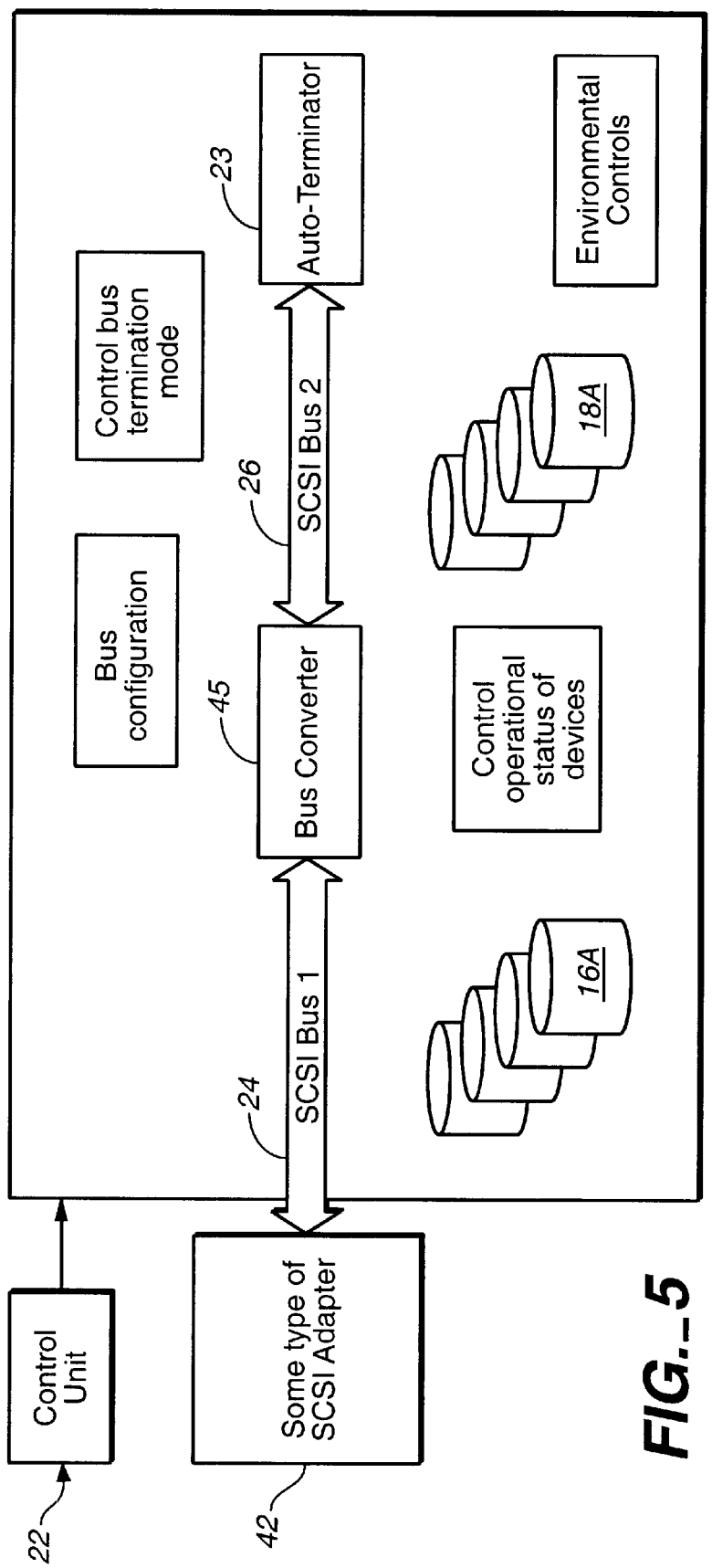
FIG._5

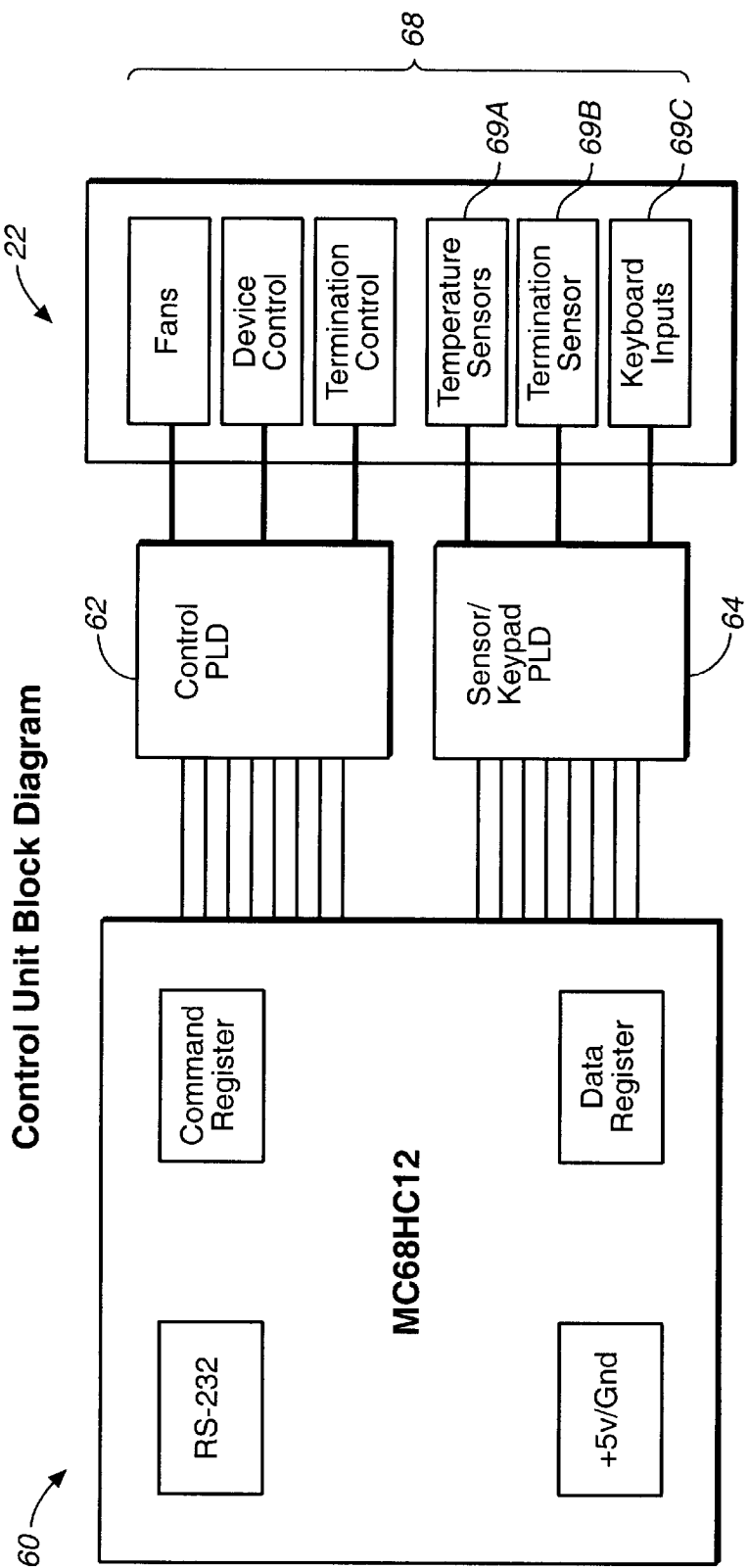

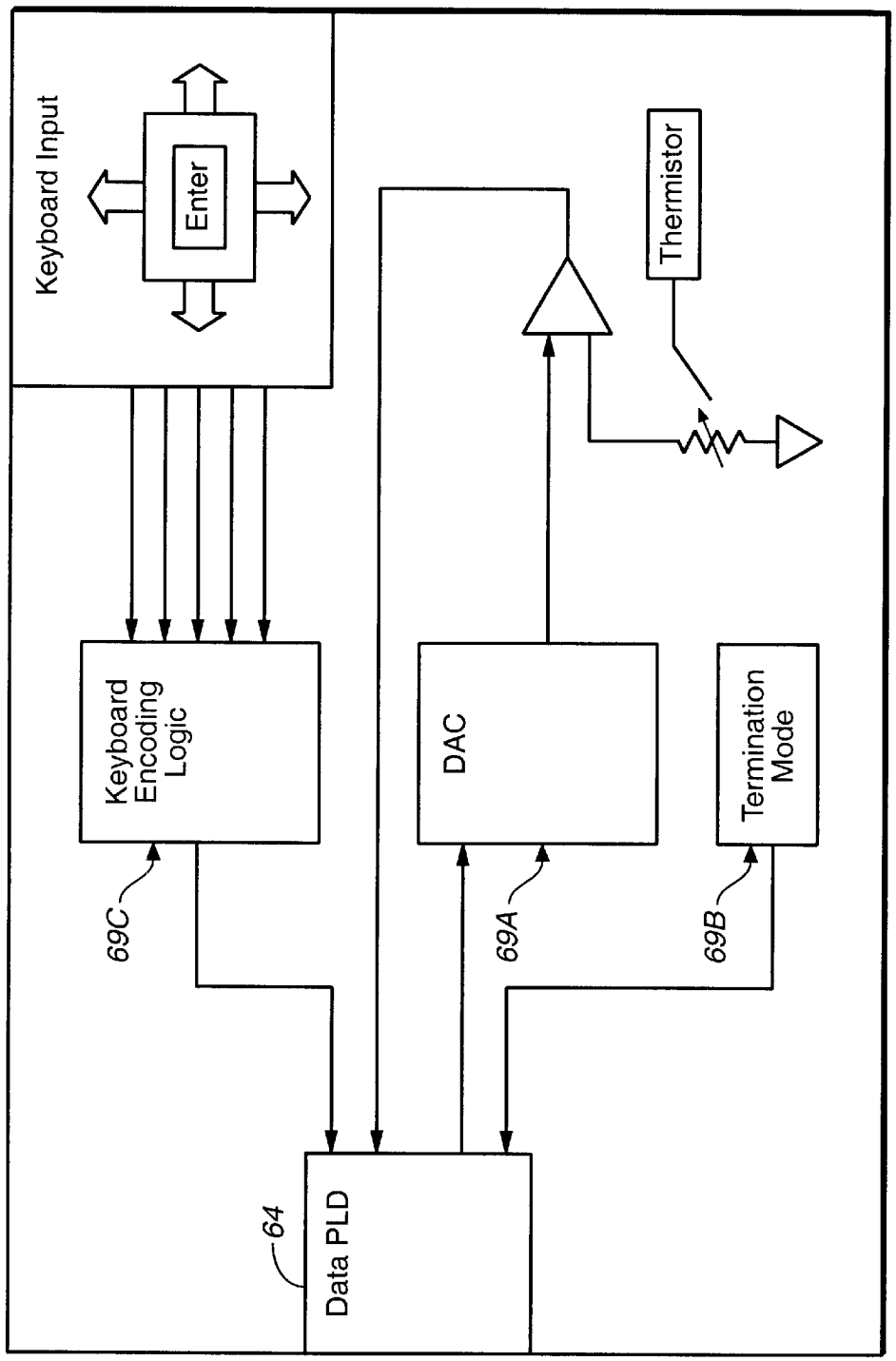
FIG._7

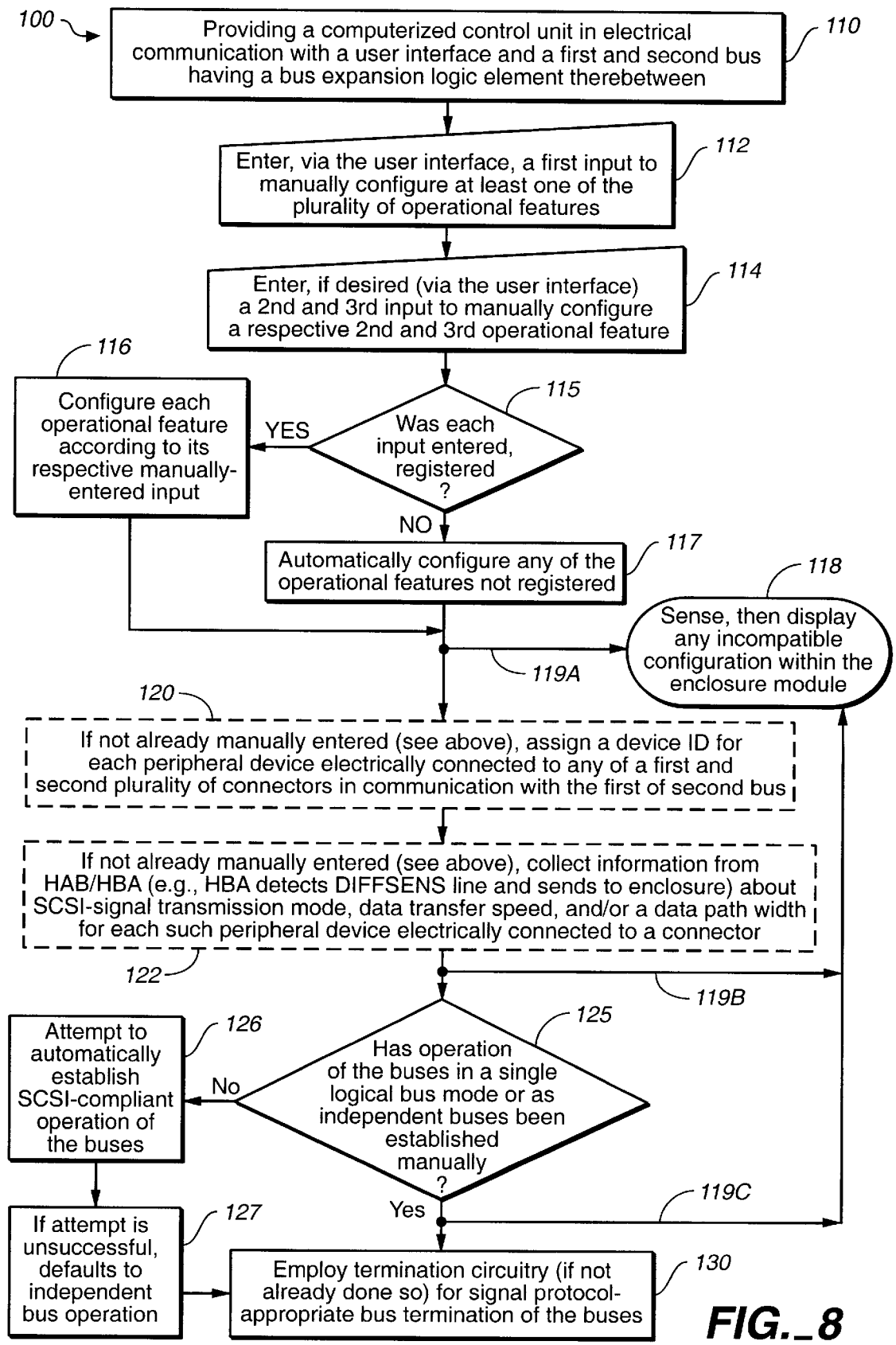
FIG._8

PROGRAMMABLE COMPUTERIZE ENCLOSURE MODULE FOR ACCOMMODATING SCSI DEVICES AND ASSOCIATED METHOD OF CONFIGURING OPERATION FEATURES THEREOF

BACKGROUND OF THE INVENTION

In general, the present invention relates to computer storage enclosures containing Fast and Ultra SCSI (up to 40 Mbytes/sec, or MBps), Ultra2 (up to 80 MBps), and Ultra3 SCSI (up to 160 MBps) peripherals; and more particularly, to a new "intelligent" SCSI-compliant computer enclosure module having a control unit for manual or auto-configuration of two independently-operational SCSI buses (also operational as a single-unified SCSI bus), auto-termination circuitry capable of configuring (automatically or manually) the termination mode for each bus, and logic for setting a SCSI ID (i.e., the bit-significant representation of a SCSI address) for each device in communication with the SCSI bus(es).

The widely-used small computer system interface (SCSI) protocol was developed for industry groups, under the American National Standards Institute (ANSI) and International Standards Organization (ISO) guidelines, to provide an efficient peer-to-peer I/O bus. A main objective of the standardized protocol adopted for SCSI parallel interface is to provide host computers with device independence within a class of devices. Devices that conform with the mechanical, electrical, timing, and protocol requirements (including the physical attributes of I/O buses used to interconnect computers and peripheral devices) of the SCSI parallel interface will inter-operate. This allows several different peripherals (hard disk drives, removable disk drives, tape drives, CD-ROM drives, printers, scanners, optical media drives, and so on) to be added at the same time to a host computer without requiring modifications to the generic system hardware. For example, personal computers (PC's or microcomputers), are inexpensive yet powerful enough to handle computationally-intensive user applications. The data storage and data sharing capabilities of PC's are often expanded by externally coupling in a cluster environment, using SCSI protocol, as many as two such computers to a group of peripheral devices such as disk drives, tape drives, printers, and scanners. Capacity on a single SCSI bus is limited to 16: The host adapter of a SCSI controller takes up one slot in a PC (and, thus, only one IRQ) but can control up to 15 peripheral devices therefrom.

The working draft of the SCSI Parallel Interface-2 Standard (SPI-2), as modified, defines the cables, connectors, signals, transceivers, and protocol used to interconnect SCSI devices. The SPI-2 working draft states that a SCSI bus consists of all the conductors and connectors required to attain signal line continuity between every driver, receiver, and terminator for each signal. In operation, a SCSI bus is a bidirectional, multimaster bus which can accommodate peer to peer communications among multiple computer processing units (CPUs) and multiple peripheral devices. A SCSI device is a device (any computer peripheral) containing at least one SCSI port and the means to connect the drivers and receivers to the bus. SCSI bus termination is required at each end of a SCSI bus (and, thereby, defines an "end" of any SCSI bus) to set the negation state when no device is driving (this is called "biasing") and to match the impedance to that of the interconnect media. SCSI signal lines must be terminated at both ends with a terminator compatible with the type/protocol of transceivers (currently defined signal transmission mode protocols include SE/LVD or HVD) used in any connected SCSI device. A termination circuit that is delivering the performance requirements for such biasing and impedance matching is considered "enabled". A switchable terminator is one that can be "disabled" by disconnecting signal lines. The electrical connection directly between two terminators forms a bus path. Improper termination of a SCSI bus will very likely cause device malfunction. Any electrical path that is not part of the bus-path is a stub. The point where a stub meets the bus path is called a stub connection.

A SCSI primary bus is one that provides for and carries 8-bit or 16-bit data transfer. A SCSI secondary bus carries an additional 16-bit data bus that, when used in conjunction with a 16-bit primary bus, provides for a 32-bit data transfer path (although the latter is not, yet, widely used). SCSI devices may connect to a bus via 8-bit, 16-bit, or 32-bit ports. To date, SCSI parallel interface devices may be implemented with either 50, 68, or 80 pin connectors (whether shielded or unshielded). Eight-bit devices are referred to as "narrow" devices (carried by 50 pin cables and connectors) and devices which permit parallel transfer of 16-bits or 32-bits at a time are called "wide" devices (carried by cables and connectors with at least 68 pin). Narrow and wide, as used in connection with SCSI compliant systems, refers to width of the data path. Data travels fast over SCSI buses, with Ultra SCSI data transfer speeds up to 40 MBps, wide Ultra2 LVD up to 80 MBps, and wide Ultra3 up to 160 MBps. Active termination of the "high byte" must be accomplished if one is to connect a wide (16- or 32-bit transfer using 68 or more pin cable/connector) device to a narrow cable or device (8-bit transfer using 50 pins). As it is well known, a typical data transfer operation over a SCSI bus between a SCSI controller (or "host adapter") located in a host computer system, to a target device (such as a disk drive) has seven SCSI "phases": (1) ARBITRATION, (2) SELECTION, (3) RESELECTION, (4) COMMAND, (5) DATA, (6) STATUS and (7) MESSAGE. For example, during the COMMAND phase, a SCSI command is transferred from the host adapter to a target (drive); and so on. Host adapter functional circuitry is typically maintained on a host bus adapter (HBA) chip on a printed circuit board structure referred to as a host adapter board (HAB) for connection to a PC host via an expansion slot. California based Adaptec, Inc., as well as the assignee hereof, design and distribute host adapters for making narrow to wide SCSI connections.

There is a patented 'one chip bus master host adapter integrated circuit' specifically designed for (i) connecting a first bus having a specified protocol for transferring information over the first bus and a first data transfer speed to a second bus having a specified protocol for transferring information over the second bus and a second data transfer speed, and (ii) transferring information between the two buses. This bus master host adapter integrated circuit (referred to in the patent as simply a 'host adapter') includes a reduced instruction set computing (RISC) processor which controls operations allowing the host adapter to function as a high speed bus master. The patented host adapter includes many features found in traditional add-in card SCSI host adapters: Bus master transfers, fast/wide SCSI, one interrupt per command, scatter/gather, overlapped seeks, tagged queuing, etc.

Transceivers transmit and receive electrical signals/information on a SCSI bus using single-ended (SE) signal transmission mode protocol or a differential protocol (either high voltage differential, HVD, or low voltage differential, LVD). Since the SE and HVD alternatives are mutually exclusive and the LVD and HVD alternatives are mutually exclusive, a bus can support only all HVD devices or SE/LVD signal transmission devices. In addition to SE, LVD, HVD transceivers and terminators, SE/LVD multi-mode transceiver and multimode terminator architecture has been designed for operation over a SCSI bus in the event it's expected that a combination of SE and LVD protocol devices will be combined thereon. The SE/LVD multimode architecture allows for either SE- or LVD-mode signals depending upon input information sensed regarding respective mode operation via DIFFSENS. Since damage can occur to a SCSI device if a HVD device is plugged into a bus containing a SE/LVD multimode transceiver, or either an SE or LVD transceiver, signal line and interconnect media protocol used over, as well as termination at the end of, each SCSI bus must be appropriately configured. In a standardized SCSI connector pin arrangement, one pin is a dedicated DIFFSENS pin for transmission mode detection: The DIFFSENS pin is generally grounded in devices operating under SE protocol so that no electrical signal is present in the DIFFSENS line. Section 7.2.5 entitled "SE/HVD transmission mode detection", and particularly Table 32, of the Working Draft SCSI Parallel Interface-2 describes requirements for DIFFSENS receiver operation for each mode.

Fibre Channel is an emerging technology capable of transferring data as fast or faster than an Ultra3 SCSI system can, over fiber optic cabling as well as copper transmission media. Fiber Channel-type host bus adapters are installed into a host computer expansion slot just as SCSI HAB's are installed. Fibre channel connections are often associated with the term "loop" (from the name Fibre Channel arbitrated loop) rather than "bus" (as SCSI devices are connected). There are actually other types of Fibre Channel connections, called "point to point" and "fabric." With fibre channel, communication between hosts and devices does not have to be done directly. Instead, users can employ hubs and switches between devices on the Fibre Channel network. Hubs and switches can be used to create Fibre Channel "storage networks". Fibre Channel cabling can be copper (which can go up to 30 meters) or fiber optic (currently up to 10 Km). In addition, no termination is necessary for fibre channel as is required in SCSI. Fiber optic ports directly placed on a peripheral device allow only for connections to fiber optic cabling. Commercially available adapters exist that allow a SCSI-compliant device to be connected to a Fiber Channel loop.

The assignee hereof has developed, and commercially distributes, a SYM2000™ Storage Drive Module as part of its family of RAID storage products. The SYM2000™ Module includes ten hot-swappable drive Customer Removable Units (CRUs) and two internal wide Ultra SCSI single-ended drive buses. The SYM2000™ Module design only allows for a limited number of hardwire storage configuration possibilities: It automatically assigns SCSI device ID's and incorporates the assignee's (1) SYM53C141™ SCSI Bus Expander chip which supports SE to SE bus expansion (in the "Repeater" or "Expander" mode of this chip) or SE to LVD bus conversion (the "Converter" mode), and (2) SYM53C120™ SCSI Bus Expander chip which also supports SE to SE bus expansion and SE to HVD bus conversion. The SYM53C120™ Bus Expander provides electrical isolation of the two SCSI buses (whether wide or narrow) between which it is sandwiched. Product reference materials are readily available for both of these Bus Expander chips, as well as the SYM2000™ Module, all of which are hereby incorporated herein by reference. Additionally, the SYM2000™ Module lacks other novel elements of the enclosure module of the invention, such as: an auto-termination control feature, software configurable bus (the SYM2000™ bus is hardwired), a 'manual' data transfer width control feature, device power-ON/OFF feature for installed devices (i.e., must physically remove, devices to disconnect in the SYM2000™), incapable of supporting two different operational bus modes (devices connected to a SYM2000™ enclosure have to be of the same transceiver mode), and a temperature control auto-monitoring feature (either fans are ON when SYM2000™ enclosure is operating, or OFF when not). Without a reasonable solution at hand to manually configure the many functional features of a SCSI-compatible storage enclosure to accept the many different types of storage peripheral devices available, an electronic designer or computer technician can be severely limited in configuration design alternatives.

The new flexible enclosure module, described herein, is designed to accommodate synchronous operation of a wide range of electronic devices, utilizing the flexibility afforded a multi-bus enclosure design plus allowing optional manual configuration and re-configuration of one or more of the many operational features of SCSI storage devices. This innovative unit has the capacity for synchronous operation of several SCSI-compliant devices electrically connected to at least a first and second bus with a bus expansion logic element therebetween that allows for operation of the buses as a single logical bus (if each device is of only one type of transceiver mode, e.g., all SE/LVD or all HVD) or as independent buses (if the devices have transmission modes of both SE/LVE or HVD).

More specifically, unlike the enclosure systems currently available, the novel enclosure module and associated method incorporate a user interface for entering at least a first input for optional manual configuration of an operational feature thereof, and if the input is not properly registered for some reason, the module has been programmed to provide for automatic configuration of that, and other, operational feature(s) as appropriate. Additionally, to accommodate additional devices with one interface, two or more enclosure modules could be handily adapted for being controlled by a common user interface via the enclosures' RS232 port, for example, in the spirit of the design goals suggested herein.

SUMMARY OF THE INVENTION

It is a primary object of this invention to provide an enclosure module for accommodating a plurality of peripheral devices that has a computerized control unit in electrical communication with a user interface and at least two buses with a bus expansion logic element therebetween that allows for operation of the buses as a single logical bus (if each device is of only one type of transceiver mode) or as independent buses as appropriate (if there is at least one device connected that is of another transceiver mode). The control unit is also in communication with termination circuitry for signal-appropriate bus termination and a first and second set of connectors (one for each of the two buses). It is also an object that a user interface for entering input for optional manual configuration of an operational feature of the enclosure module be included. It is also an object of this invention to provide an associated method of configuring a plurality of operational features, at least one of which can be done manually, of an enclosure module that can accommodate a plurality of peripheral devices. This method includes the steps of: entering, through the user interface, an input to manually configure at least one of the plurality of operational features; and if not properly registered, automatically configuring that operational feature.

The advantages of providing both the flexible new enclosure module and the new method of configuring a plurality of operational features, as described herein, follow:

(a) Key operational features (such as, a device ID for any one of, or all, the devices electrically connected to a corresponding connector; a SCSI signal transmission mode for any one of, or all, the devices so connected; pin-configuration of any one of, or all, connected devices; ON/OFF status of any the devices; the bus mode operation of the two buses (as a single logical bus or as independent buses), data transfer width of each device, enablement or disablement of signal-appropriate bus termination; and so on) can be manually configured, or reconfigured, via handy user interface by a technician familiar with mechanical, electrical, timing, and protocol requirement of SCSI parallel interface.

(b) Due to the many different configurations of disk and tape drives, printers, optical media drives, and other peripheral parallel-processing devices, and due to the fact that a device operating under SE/LVD and one that operates in a HVD environment cannot be operated along the same logical bus, it is desirable to have available in an enclosure, at least two logical buses— one for SE/LVD and the other for HVD if necessary— as well as the capability to readily configure bus operation via programmed user interface.

(c) An 'intelligent' storage enclosure module programmed to check the system for incompatible/noncompliant configuration (whether done continuously or discretely at certain points throughout the process of configuring the enclosure) aids in reducing inadvertent component, device, or system failure.

(d) Module design flexibility and versatility—Devices connected to the enclosure of the invention may be readily replaced and different SCSI devices having different operating characteristics can be added, and any associated re-configuration quickly performed, to an enclosure of the invention so that it can address storage problems in a wide variety of environments; and, two enclosures could be adapted for control by a common user interface.

(e) Design simplicity-Reducing overall fabrication costs, off-the-shelf bus expander and host adapter products available from the assignee hereof, plus LVD/SE and HVD terminator chips, control unit processing chips, and associated cabling are readily available for fabrication and programming according to the unique design and method of the invention to create the new enclosure module.

Briefly described, again, the invention includes an enclosure module for accommodating a plurality of peripheral devices. The module has: a computerized control unit in electrical communication with a user interface, a first and second bus with a bus expansion logic element therebetween that allows for operation of the buses as a single logical bus or as independent buses, termination circuitry for signal-appropriate bus termination, and a first and second plurality of connectors, each for electrical connection with one of the peripheral devices. The connectors are in communication with the buses. The user interface is for entering a first input for optional manual configuration of an operational feature of the enclosure module, and the module is programmed so that, if the input is not registered, the operational feature can be automatically configured without the particular information provided by the input. Key operational features include: a device ID for any one of, or all, the devices electrically connected to a corresponding connector; a SCSI signal transmission mode for any one of, or all, the devices so connected; pin-configuration of any one of, or all, connected devices; ON/OFF status of any the devices; the bus mode operation of the two buses (as a single logical bus or independent buses), data transfer width of connected devices, enablement or disablement of signal-appropriate bus termination; and so on. The first input can include, for example, the assigning of one device ID for each of the peripheral devices electrically connected, enablement of the signal-appropriate bus termination, causing an independent or separate logical bus operation, and so on.

Additional design features that further distinguish the module of the invention from known enclosure designs include: The user interface may also be capable of receiving a second, third, fourth, and so on, input for optional manual configuration of a second, third, fourth, respectively, operational feature of the enclosure module. The control unit can provide instructions to the bus expansion logic element (whether the bus expander is logically-defined outside thereof or considered a part of the control unit) for operation of the buses (as a single bus or independent buses) in the event input is either not entered, or entered but not properly registered. The termination circuitry can include a plurality of terminator IC elements, each positioned at a logical end of the buses for enabling, as necessary (whether done manually or automatically via the bus expansion logic element or control unit), the signal-appropriate bus termination. The connectors can each have a multi-connect assembly for connection with a first, second, and third type SCSI connector. The control unit can receive information (for example, from the HAB or from a 'smart' multi-connect assembly) about the SCSI signal transmission mode for each peripheral device electrically connected to instruct the bus expansion logic element for bus operation. The user interface may have a liquid crystal display (LCD) or other means for displaying status information about operational features such as bus operation (two independent or single bus) and associated mode (SE/LVD/HVD), device ID and status, and proper bus termination.

Also characterized herein is an associated method of configuring a plurality of operational features, at least one of which can be done manually, of an enclosure module that can accommodate a plurality of peripheral devices. The method of the invention has the steps of: providing a computerized control unit in electrical communication with a user interface, a first and second bus with a bus expansion logic element therebetween that allows for operation of the buses as a single logical bus or as independent buses, termination circuitry for signal-appropriate bus termination, and a first and second plurality of connectors, each for electrical connection with one of the devices; entering, through the user interface, a first input to manually configure at least one of the operational features; and if no such input is registered, automatically configuring the operational feature.

Additional design features that further distinguish the novel method include: detecting a signal transmission mode and a data transfer width for any one or more of the peripheral devices connected for SCSI-compliant operation of the buses; displaying status information of any incompatible configuration sensed by the enclosure; automatically reconfiguring an incompatible configuration (e.g., resolving conflicting device IDs), if sensed, to be SCSI-compatible; enabling a plurality of terminator integrated circuit (IC) elements of the termination circuitry to cause signal-appropriate bus termination; and so on.

BRIEF DESCRIPTION OF THE DRAWINGS

For purposes of illustrating the flexibility of design and versatility of the innovative preferred apparatus and method, the invention will be more particularly described by referencing the accompanying drawings of embodiments of the invention (in which like numerals designate like parts). The figures have been included to communicate the features of the invention by way of example, only, and are in no way intended to unduly limit the disclosure hereof.

FIG. 1A is an isometric schematic of a preferred enclosure module of the invention.

FIG. 1B is an isometric schematic of a preferred multi-connect assembly showing at least three SCSI type connectors, but more connectors can be accommodated.

FIG. 2 is a block-diagram schematic of a preferred enclosure module, similar to that in FIG. 1A, electrically connected via wide SCSI cable, for example, to a Host System host adapter board (HAB) or through a fibre-channel converter to a fibre-channel controller.

FIG. 3 is a block-diagram schematic of a 'smart' multi-connect assembly, similar to the connector assembly illustrated in FIG. 1B.

FIG. 4 is another block-diagram illustrating how certain of the features may interconnect with a Control Unit of the FIG. 1A enclosure module.

FIGS. 5, 6, and 7 are block diagrams of main features of a Control Unit, with FIGS. 6 and 7 providing more detail of the processor and its programming structure.

FIG. 8 is a flow diagram of preferred steps in a method of configuring operational features of an enclosure module that can accommodate a plurality of peripheral devices.

DETAILED DESCRIPTION OF THE PREFERRED AND ALTERNATIVE EMBODIMENTS

Preferred module 10 in FIG. 1 has a handy user interface 12 with some type of alphanumeric display 13 (which may be a liquid crystal display, LCD, identifying LEDs, mechanical display, tonal/acoustic device, or other suitable component for communicating status of the enclosure to a technician) and a means (at 14) by which a technician can enter input into the interface such as a direction-arrow keypad, touch-sensitive screen, a set of labeled buttons, joystick, mouse, voice-recognition device, etc. Two rows of stacked device bays 16A and 18A, with grated cooling fan assemblies 19A, 19B, 19C can be seen in electrical connection to corresponding connectors, such as those labeled 18B for the device bays labeled 18A. Both sets of connectors 16B (one of which is labeled in FIG. 2) and 18B are in communication with a respective bus 24 and 26 both of which are in electrical communication with Control Unit 22 and termination control (labeled "TC" at 23). The circuitry for the Control Unit, the bus expander element (whether or not considered a part thereof), TC, and associated physical wiring, as well as external connectors 28, 29B allowing for communication with the host adapter of a host system (shown, schematically at 40 in FIG. 2), plus a suitable power supply 30, can be structurally supported by a midplane 20.

Adding to the flexibility of the enclosure 10 design, connectors 16B, 18B are preferably able to accept different types of peripheral devices (not shown, for simplicity) with different physical connectors. FIG. 1B illustrates one preferred alternative multi-connect assembly with a barrel-shaped design having a barrel 35 with at least three different connectors 34, 36, 38 extending radially outwardly therefrom and in electrical communication with wiring that leads (arrow 39) to a respective bus. When a particular pin configuration is desired, barrel 35 can be rotated (arrow 37) to click in place the desired connector. Hard-wiring for such a multi-connect assembly 18B preferably accommodates the widest bus expected to be encountered with a connected peripheral devices, along with the capacity to sense/detect information regarding the status of the connected device (using DIFFSENS voltage signal to detect transmission mode) and send it to the Control Unit 22.

Preferred functional boundaries for several critical features of the invention are shown in FIG. 2: Device 10 is has logical "bus 1" (24) and "bus 2" (26) in communication with 'universal'/multi-connect assemblies (one of each set is labeled "uc" at 16B, 18B), a Control Unit 22, bus expander 45, Termination Control 23, and a user interface 12 for entering input to configure one, or more, of the enclosure's several operational features. External connectors 28, 29A, 29B, 29C (identified as SCSI connectors) allow for electrical connection with, for example, a suitable host adapter board (HAB) 42, hundreds of which are commercially available, and other computerized SCSI-compliant devices. In operation, as explained in greater detail below, device bays (16A, 18A) can accept peripheral devices of many types as long as the devices (not shown) fit within the dimensions of the device bays and are recognized SCSI peripherals; such devices include disk drives (CD-ROM, Iomega's ZIP® or JAZ®, and magneto-optical drives), tape drives, and, with additional cabling, scanners and printers/FAX machines. Once a device connector is properly seated into a mating connector 34, 36, 38 of multi-connect assembly 18B, to prevent damage to the enclosure and prevent an invalid bus configuration it is important to either: (a) manually input information into the user input 12 concerning its SCSI transmission mode (HVD, LVD, or SE), data path width, and SCSI ID; or (b) to detect/assign each of these operational features for the connected device in an automatic fashion, prior to engaging the device to operate from one or the other of bus 24 or 26. The connect assembly 18B shown schematically in FIG. 3 illustrates certain features of the invention designed to do the latter. The module 10 is connected to HAB 42 via SCSI cabling 32 and a wide connector 44 (or, if connecting the enclosure module 10 with fibre-channel hardware, one needs a suitable converter 46 and a fibre-channel controller 42 having a fibre-channel connector 44). Whether or not HAB 42 is employed to send information to the Control Unit 22 regarding the transceiver mode of each connected device, once the mode is detected, corresponding status information can be communicated through user interface 12 to display (LCD 13 or by other means) an incompatible configuration.

If a particular device is selected to be sensed or 'checked' by the Control Unit (alternatively, the checking could be manually selected by user input at 12), as represented by the signal sense/detect functional block at 49 in FIG. 3: An analog-to-digital converter (ADC) is used to measure the DIFFSENS voltage (48) for sensing transmission mode; once the DIFFSENS signal has been identified and a connector choice selected, this information is preferably encoded into a 4-bit value (as follows) and sent (represented by arrow 50) to Control Unit 22 for further processing. An example of this 4-bit value is follows: bit 3 to represent 'upper byte enable' (0 for wide, 1 for narrow), bit 2 to represent whether the device is HVD (1 for HVD present, 0 for HVD not-present), bit 1 for LVD type transmission (1 for LVD, 0 for LVD not present), and bit 0 for SE type transmission (1 for SE, 0 for SE not present). The Control Unit decodes the 4-bit value and enables, or disables if the device configuration is nonconforming, router 51 to connect the device and its respective multi-connect assembly to bus 26.

FIG. 4 provides slightly more detail concerning a preferred interconnection between components of enclosure module 10. Bus expander 45 preferably has functional features similar to those found, for example, in the assignee's SYM53C120™ SCSI Bus Expander chip which supports SE to SE bus expansion and SE to HVD bus conversion plus provides electrical isolation of the two buses shown at 24, 26 (whether operating as wide or narrow). Additionally, the bus expander elements labeled 54, 56 preferably have functional features/characteristics similar to those found in, for example, the assignee's SYM53C141™ SCSI Bus Expander chip which supports SE to SE bus expansion (Expander mode) or SE to LVD bus conversion (Converter mode) to default either of the buses 24, 26 to SE mode when both LVD and SE devices are connected to respective connectors 16B, 18B. The four places along buses 24, 26 at which a box is located and labeled A, B, C, and D represent the points at which an external 68-pin SCSI connector is preferably positioned. FIG. 5 illustrates a preferred functional representation of Control Unit 22 further illustrating the labeled features mentioned above.

FIGS. 6 and 7 illustrate functional logic details for the Control Unit 22. At 60 is a processor unit (shown here, by way of example only, is Motorola 68HC12 evaluation board) with two programmed logic devices (PLD's) for the enclosure module 10—a control PLD 62 and a sensor/keypad PLD 64 to serve as hardware interface between the processor and the external sensors 68—plus several external sensor inputs 68. Two 8-bit registers (identified as a Command Register 65A and a Data Register 65B) interface between the processor chip and external logic. The LCD 13 from user interface 12 (see FIG. 2) can be connected to RS232 port 65C to aid in the optional 'manual' configuration of the enclosure 10 by displaying certain alphanumeric characters relating to status. Preferably in operation, once the enclosure is powered-on, the LCD 13 will prompt a technician for input for a selection of operational features, such as: a device ID for any one of, or all, the devices electrically connected to a corresponding connector; a SCSI signal transmission mode for any one of, or all, the devices so connected; pin-configuration of any one of, or all, connected devices; ON/OFF status of any the devices; the bus mode operation of the two buses (as a single logical bus or independent buses); data transfer speed over each bus; enablement or disablement of signal-appropriate bus termination; a threshold operating temperature for each device electrically connected, and so on. By way of example, PLD's 62, 64 can be programmed using Abel HDL (hardware design language).

FIG. 7 diagrammatically illustrates how sensor/keypad PLD 64 can operate to decode a command from the processor to the external modules and decode information from the external sensors 69A, 69B, 69C and return it to the processor. Note here, that monitoring of the enclosure's overall system temperature is important. In the event it is sensed that the enclosure circuitry is overheating, the Control Unit 22 will activate cooling fan(s) and/or power OFF any one or more device to return the system to standard/safe operating temperature. By way of example only to provide more detailed operational information about the operation of FIGS. 6 and 7, the 2-page ATTACHMENT A entitled Programming Interface for ISE Control Unit, is hereby incorporated by reference.

FIG. 8 further illustrates the design flexibility of the invention as in flow-diagram form pointing out particular features of a preferred method 100 of configuring operational feature(s) of an enclosure module such as that shown at 10 in FIGS. 1 and 2. Starting at 110, an enclosure module such as that shown in FIGS. 1 and 2 is used to enter (112), via its user interface 12, a first input to manually configure at least one operational feature of the enclosure. If desired or as necessary, a second, third, fourth, and so on, input can be entered using the user interface 12 to configure a second, third, fourth, operational feature, respectively. Once the input has been entered, for example, a SCSI ID has been assigned to the device connection, transceiver mode and/or data transmission path width and speed of the device are entered, or signal protocol-appropriate termination is enabled, the enclosure is so instructed by its programming logic and the respective configuration(s) performed (116). Any of the requisite features for which input was entered but not properly registered 115 (for whatever reason) by Control Unit 22, must be automatically configured 117 by the computerized enclosure. It is possible that either the input entered (115), the corresponding instruction carried out (116), or an automatic configuration performed (117) represents an illegal configuration (e.g., installing an HVD device onto a bus with SE/LVD devices). It is critical to identify illegal configurations before damage is done (path 119A, 119B, 119C) and display results thereof (118) for reconfiguration or removal of the device prior to an inadvertent failure.

Next, there are several critical operational features of the flexible enclosure module of the invention that must be configured automatically by a processor and its associated programmed logic, if not done manually using the user interface 12 (steps 120, 122, 125): assigning a device ID for each peripheral device electrically connected to any of the connectors 16B, 18B; collecting critical information from the HAB/HBA or elsewhere about transceiver mode (for example, the HBA or other circuitry associated with the connector(s) 16B, 18B can detect DIFFSENS line 48) and sending it to the Control Unit 22; and providing instructions for compliant operation of the buses 24, 26 as two independent buses or one logical bus. If an attempt to automatically do the latter 126 is unsuccessful, the default is an independent bus mode (127)—to prevent device or enclosure component failure. And finally, termination circuitry must be employed (if not already done so) for enabling signal-appropriate bus termination of the buses (see box 130). Regarding these last operational features, return for a moment to FIGS. 2 and 4—suitable terminator IC's are commercially available from Dallas Semiconductor, Inc. that can be positioned at the physical ends of buses 24, 26 for ready activation as needed for signal SCSI-protocol termination, they include the DS2108™ Differential SCSI Switchable Terminator chip and the DS2119™ Ultra2 LVD/SE SCSI Terminator chip—the specifications of which are hereby incorporated by reference.

While certain representative embodiments and details have been shown merely for the purpose of illustrating the invention, those skilled in the art will readily appreciate that various modifications may be made to the invention without departing from the novel teachings or scope of this invention. Accordingly, all such modifications are intended to be included within the scope of this invention as defined in the following claims. Although the commonly employed preamble phrase "comprising the steps of" may be used herein, or hereafter, in a method claim, the Applicants in no way intends to invoke Section 112 ¶6. Furthermore, in any claim that is filed hereafter, any means-plus-function clauses used, or later found to be present, are intended to cover the structures described herein as performing the recited function and not only structural equivalents but also equivalent structures.

What is claimed is:

1. An enclosure module for accommodating a plurality of peripheral devices, comprising:

a computerized control unit in electrical communication with a user interface, a first and second bus with a bus expansion logic element therebetween that allows for operation of said first and second buses as a single logical bus or as independent buses, termination circuitry for signal-appropriate bus termination, and a first and second plurality of connectors, each of said connectors for electrical connection with one of the plurality of peripheral devices;

said first plurality of connectors in communication with said first bus and said second plurality of connectors in communication with said second bus; and said user interface for entering a first input for optional manual configuration of an operational feature of the enclosure module, and if said input is not registered, said operational feature capable of automatic configuration without said input.

2. The enclosure module of claim 1 wherein said operational feature is selected from the group consisting of: a device ID for any of said peripheral devices electrically connected to one of said plurality of connectors, a SCSI signal transmission mode for at least one of said peripheral devices so connected, pin-configuration of any of said peripheral devices so connected, ON/OFF status of any of said peripheral devices so connected, said operation of said first and second buses, data transfer speed over said first and second buses, and enablement of said signal-appropriate bus termination.

3. The enclosure module of claim 2 wherein said first input comprises assigning one of said device ID's for each of said peripheral devices electrically connected to a corresponding one of said plurality of connectors, and said user interface is further capable of receiving a second input for optional manual configuration of a second operational feature of the enclosure module, said second operational feature also being selected from said group.

4. The enclosure module of claim 1 wherein a SCSI signal transmission mode for any of said peripheral devices electrically connected is detected and communicated to the enclosure module, and said bus expansion logic element comprises termination logic for enabling said signal-appropriate bus termination.

5. The enclosure module of claim 1 wherein said control unit is programmed to receive information about a SCSI signal transmission mode for any of said peripheral devices electrically connected, said control unit comprises termination logic for enabling said signal-appropriate bus termination, and said user interface has a liquid crystal display (LCD) and an incompatible configuration indicator.

6. The enclosure module of claim 1 wherein:

said user interface is further capable of receiving a second and third input for optional manual configuration of a second and third, respectively, operational feature of the enclosure module, said second operational feature to comprise SCSI signal transmission mode for any of said peripheral devices so electrically connected; and using said second input, said control unit instructs said bus expansion logic element for said operation of said first and second buses.

7. The enclosure module of claim 1 wherein: said termination circuitry comprises a plurality of terminator integrated circuit (IC) elements; each said IC element positioned at an end of each of said first and second buses for enabling said signal-appropriate bus termination based upon SCSI signal transmission mode information detected for each of said peripheral devices so electrically connected.

8. The enclosure module of claim 1 wherein:

said termination circuitry comprises a plurality of terminator integrated circuit (IC) elements, each said IC element positioned at one end of each of said first and second buses;

said operational feature comprises enablement of said terminator IC elements for said signal-appropriate bus termination; and each of said plurality of connectors comprises a multi-connect assembly for connection with any of a first, second, or third type SCSI connector.

9. The enclosure module of claim 8 wherein said first, second, and third type SCSI connectors each comprise a different pin configuration to accept said electrical connection with any one of the plurality of peripheral devices; and each of said connectors is capable of detecting SCSI signal transmission information for said any peripheral device.

10. The enclosure module of claim 1 wherein: a SCSI signal transmission mode for each said peripheral device electrically connected to said first plurality of connectors is of a first type; a SCSI signal transmission mode for each said peripheral device electrically connected to said second plurality of connectors is of a second type different from said first type; and said operational feature comprises said operation of said first and second buses.

11. The enclosure module of claim 1 wherein a SCSI signal transmission mode for each said peripheral device electrically connected to either said first or second plurality of connectors is of a first type; said bus expansion logic element causes operation as said single logical bus, and said bus expansion logic element further comprises termination logic for enabling said signal-appropriate bus termination.

12. The enclosure module of claim 1 wherein: said control unit is programmed to receive information about a SCSI signal transmission mode for each said peripheral device electrically connected, and instructs said bus expansion logic element for said bus operation; and said control unit further comprises termination logic for enabling said signal-appropriate bus termination.

13. An enclosure module for accommodating a plurality of peripheral devices, comprising:

a computerized control unit in electrical communication with a user interface, a first and second bus with a bus connect/separation element therebetween that allows for operation of said first and second buses as a single logical bus or as independent buses, termination circuitry for signal-appropriate bus termination whether said buses operate in said single logical bus mode or independently, and a first and second plurality of connectors, each of said connectors for electrical connection with one of the plurality of peripheral devices; and said user interface for entering a first, second, and third input for optional manual configuration of a first, second, and third operational feature, respectively, of the enclosure module, and for any of said inputs not registered, a respective one of said operational features capable of automatic configuration.

14. The enclosure module of claim 13 wherein:

each of said first, second, and third operational features is selected from the group consisting of: a device ID for any of said peripheral devices electrically connected to one of said plurality of connectors, a SCSI signal transmission mode for at least one of said peripheral devices so connected, pin-configuration of any of said peripheral devices so connected, ON/OFF status of any of said peripheral devices so connected, said operation of said first and second buses, data transfer speed over said first and second buses, and enablement of said signal-appropriate bus termination; and said user interface has a plurality of light-emitting diode (LED) indicators for displaying status information about said first, second, and third operational feature.

15. The enclosure module of claim 13 wherein: said control unit is programmed to receive information about a signal transmission mode for each said peripheral device electrically connected, and instructs said bus connect/separation element for said bus operation; said control unit comprises termination logic for enabling said signal-appropriate bus termination; and said user interface has a liquid crystal display (LCD) for displaying status information about said bus operation and signal-appropriate bus termination.

16. The enclosure module of claim 13 wherein:

said first operational feature comprises ON/OFF status of any of said peripheral devices electrically connected;

said second operational feature comprises signal transmission mode information for each said peripheral device so connected;

using said first and second input, said operation of said first and second buses is set; and said user interface has an indicator for displaying an internal temperature of the module.

17. The enclosure module of claim 13 wherein: a SCSI signal transmission mode for each said peripheral device electrically connected to said first bus is of a first type; a SCSI signal transmission mode for each said peripheral device electrically connected to said second bus is of a second type different from said first type; said bus connect/separation element causes an independent operation of said first and second buses; and said user interface has an indicator for displaying status information about a an operating temperature for any of said peripheral devices so connected.

18. A method of configuring a plurality of operational features, at least one of which can be done manually, of an enclosure module that can accommodate a plurality of peripheral devices, comprising the steps of:

providing a computerized control unit in electrical communication with a user interface, a first and second bus with a bus expansion logic element therebetween that allows for operation of said first and second buses as a single logical bus or as independent buses, termination circuitry for signal-appropriate bus termination, and a first and second plurality of connectors, each of said connectors for electrical connection with one of the plurality of peripheral devices;

entering, through said user interface, a first input to manually configure at least one of the plurality of operational features; and if no said input is registered, automatically configuring said one of the plurality of operational features.

19. The method of claim 18 wherein said at least one of the plurality of operational features is selected from the group consisting of: a device ID for any of said peripheral devices electrically connected to one of said plurality of connectors, a SCSI signal transmission mode for at least one of said peripheral devices so connected, pin-configuration of any of said peripheral devices so connected, ON/OFF status of any of said peripheral devices so connected, said operation of said first and second buses, data transfer speed over said first and second buses, and enablement of said signal-appropriate bus termination.

20. The method of claim 18 wherein said first input causes enablement of said signal-appropriate bus termination, and further comprising the steps of: detecting a signal transmission mode and a data transfer width for any of said peripheral devices electrically connected for SCSI-compliant operation of said first and second buses; and displaying status information on said user interface of any incompatible configuration sensed by the enclosure module.

21. The method of claim 18 further comprising the steps of:

entering a second and third input to configure a second and third feature, respectively, of the plurality of operational features;

if no said second or third input is registered, providing that said control unit automatically configure any said second or third feature of the plurality of operational features; and sensing any incompatible configuration of the enclosure module and communicating any said incompatible configuration sensed, to a user of the enclosure module.

22. The method of claim 18 wherein said first input causes an independent operation of said first and second buses; and further comprising the step of entering a second input into said user interface to assign a device ID for each of said peripheral devices electrically connected to a corresponding one of said plurality of connectors.

23. The method of claim 22 further comprising the steps of:

sensing any incompatible configuration of the enclosure module and automatically reconfiguring said incompatible configuration to be SCSI-compatible; and enabling a plurality of terminator integrated circuit (IC) elements of said termination circuitry for said signal-appropriate bus termination.

* * * * *